(12) United States Patent
Carlsson

(10) Patent No.: US 6,253,751 B1
(45) Date of Patent: Jul. 3, 2001

(54) METHOD AND DEVICE FOR FUEL PROPORTIONING IN A GAS-POWERED COMBUSTION ENGINE

(75) Inventor: Göran Carlsson, Nykvarn (SE)

(73) Assignee: Scania CV Aktiebolag (SE)

( * ) Notice: Subject to any disclaimer, the term of this patent is extended or adjusted under 35 U.S.C. 154(b) by 0 days.

(21) Appl. No.: 09/403,534
(22) PCT Filed: Apr. 23, 1998
(86) PCT No.: PCT/SE98/00740
§ 371 Date: Oct. 21, 1999
§ 102(e) Date: Oct. 21, 1999
(87) PCT Pub. No.: WO98/48163
PCT Pub. Date: Oct. 29, 1998

(30) Foreign Application Priority Data

Apr. 24, 1997 (SE) .................................................. 9701530

(51) Int. Cl.[7] .......................... F02D 41/14; F02D 19/02; F02M 21/02
(52) U.S. Cl. .......................... 123/683; 123/527; 123/687
(58) Field of Search .................................. 123/527, 681, 123/683, 684, 687

(56) References Cited

U.S. PATENT DOCUMENTS

| | | | |
|---|---|---|---|
| 4,141,326 | * | 2/1979 | Wolber .................................. 123/684 |
| 4,188,919 | * | 2/1980 | Bruce ................................ 123/527 X |
| 4,263,883 | * | 4/1981 | Treible et al. .................... 123/527 X |
| 4,364,364 | * | 12/1982 | Subramaniam ....................... 123/527 |
| 4,512,304 | * | 4/1985 | Snyder ................................. 123/344 |
| 4,592,325 | * | 6/1986 | Nakagawa ............................ 123/675 |
| 4,858,583 | | 8/1989 | Sonntag ............................... 123/527 |
| 5,251,602 | * | 10/1993 | Kurihara et al. .................... 123/527 |
| 5,255,657 | | 10/1993 | Stellwagen ........................... 123/527 |
| 5,337,722 | * | 8/1994 | Kurihara et al. .................... 123/527 |
| 5,343,847 | | 9/1994 | Chasteen et al. ..................... 123/527 |
| 5,357,938 | * | 10/1994 | Bedford et al. ..................... 123/685 |
| 5,860,407 | * | 1/1999 | Chapin et al. .................. 123/527 X |

FOREIGN PATENT DOCUMENTS 0690215   1/1996   (EP) .

* cited by examiner

Primary Examiner—Tony M. Argenbright
(74) Attorney, Agent, or Firm—Ostrolenk, Faber, Gerb & Soffen, LLP

(57) ABSTRACT

Fuel proportioning in a gas-powered combustion engine is effected so that when the value of a parameter monitored in the exhaust gases deviates from a set-value, the level of the gas input pressure to a mixer for gas and air is adjusted in a specified operating situation so that said set-value is established. A device for fuel proportioning includes a pressure regulator (3) whereby the outlet pressure can be adjusted automatically during a specified operating situation by means of a control unit (11). After adjustment has been carried out, the setting reached is maintained for a lengthy period.

10 Claims, 2 Drawing Sheets

METHOD AND DEVICE FOR FUEL PROPORTIONING IN A GAS-POWERED COMBUSTION ENGINE

BACKGROUND OF THE INVENTION

The invention relates to a method for fuel proportioning in a gas-powered combustion engine. It also relates to a device for such fuel pro portioning.

Gas intended for driving a gas engine is usually stored at high pressure. After pressure reduction in one or more stages, the as is mixed with air in correct proportions for good combustion. A larger or smaller quantity of gas and air is supplied, depending on the load.

Mixing of gas and air usually takes place in a mechanical type of mixer which has to be set for the particular quality of gas by applying a manual basic setting for maintaining the intended ratio between gas and air during load variation. When steady conditions prevail, the desired good combustion result is achieved, but if the gas proportion changes, e.g. because of pressure change, gas quality change or any other reason, an adjustment is required to restore the correct proportions of gas and air and hence achieve the intended good combustion. A need for adjustment of this kind may arise, for example, from refuelling. There have also been found to be relatively large differences in the quality of gas fuel available in different geographical areas. This means that the manufacture of gas engines has to include individual adaptation of each engine according to the market or geographical area for which it is intended. The way gas engines are often used means that they are always refuelled from the same filling stations. In such cases it is sufficient, at least for a certain time, to abide by the manufacturer's original setting, but the fact that without adjustment the engine cannot be used in other geographical areas or use fuel from other fuel filling stations does of course limit the possibilities of using such an engine in, for example, a vehicle intended to travel considerable distances.

From the operating point of view it would be a great advantage if adjustment could be effected automatically. This would not only mean that any carelessness or forgetfulness on the occasion of refuelling need not cause bad combustion but also that a difficult operation could be obviated. It would thus be easier for gas-powered vehicles to use fuel from different filling stations, thereby facilitating lengthy journeys.

Like a diesel engine, a gas-powered combustion engine usually operates with excess air, i.e. with an air/fuel ratio greater than 1.0. This means that the oxygen content of the exhaust gases cannot be measured by means of the conventional type of $\lambda$ probe which is usually employed for gasoline engines to aim at a value of about 1.0, since what is required is a different type of $\lambda$ probe which can monitor higher $\lambda$ values. As such $\lambda$ probes have now reached the market, various designs have been proposed whereby continuous adaptation and correction of the air/fuel ratio takes place in the actual mixer on the basis of signals from the $\lambda$ sensor.

Also known is the use of electronically controlled gas injection whereby a control unit calculates and proportions the required gas quantity on the basis of various operating data.

A disadvantage of these solutions is that they are relatively sensitive and require a great deal of maintenance.

SUMMARY OF THE INVENTION

One object of the invention is to use simple means to make simple and reliable and yet precise fuel proportioning possible in a gas-powered combustion engine in varying external conditions. Further objects are to maintain good reliability of a mechanical gas mixer and achieve at moderate cost stable emission and torque levels.

These objects are achieved according to the invention by a method of fuel proportioning for a gas powered combustion engine which includes: mixing gas after reduction thereof with air to form a gas/air mixture and supplying the gas/air mixture to the engine; monitoring a parameter in the engine exhaust which is related to the proportion of air and gas in the mixture; and when the value of the parameter deviates from a set-value, if at essentially the same time the engine is operating in a predetermined situation, adjusting the value of the parameter back to its set-value by adjusting the pressure level brought about by the pressure reduction. According to an advantageous embodiment of the invention it is appropriate to use the air/fuel ratio as the parameter monitored in the engine's exhaust gases and to carry out adjustment at full load and within a limited engine speed range. Effecting adjustment in this manner makes it possible to limit the need for adjustment so that it need only be effected relatively infrequently. Adjustment being also carried out automatically by means of suitable equipment achieves good operating results.

A device proposed according to the invention for fuel proportioning in a gas-powered combustion engine includes: a pressure regulator for reducing the pressure of gas supplied thereto; a mixer arranged after the pressure regulator for receiving the reduced pressure gas from the pressure regulator and mixing the reduced pressure gas with air to form a gas/air mixture; an exhaust sensor arranged in the outlet of the engine; a control unit connected to the exhaust sensor for resetting the proportion of the gas/air mixture as a function of an output signal from the exhaust sensor; and at least one operating sensor connected to the control unit for indicating the operating state of the engine. The control unit is connected to an actuator coupled to the pressure regulator and is arranged to activate the actuator when the value of the output signal from the exhaust sensor deviates from a predetermined set-value, if at essentially the same time the operating sensor indicates that a predetermined operating situation prevails, to adjust the pressure level of the reduced pressure gas to reset the output signal from the exhaust sensor to the predetermined set-value thereof. Such a device makes it possible to use a conventional mechanical gas mixer, with the latter's accompanying advantages. Moreover, only relatively infrequently does the device proposed according to the invention need to come into action.

The exhaust sensor used is advantageously a $\lambda$ probe for measuring $\lambda$ values greater than 1.0. Further features and advantages of the invention are indicated by the following detailed description and patent claims.

Other features and advantages of the present invention will become apparent from the following description of the invention which refers to the accompanying drawings.

BRIEF DESCRIPTION OF THE DRAWINGS

The invention is explained in more detail below by means of an embodiment depicted in the drawings, in which.

DETAILED DESCRIPTION OF THE PREFERRED EMBODIMENTS

Figure 1:
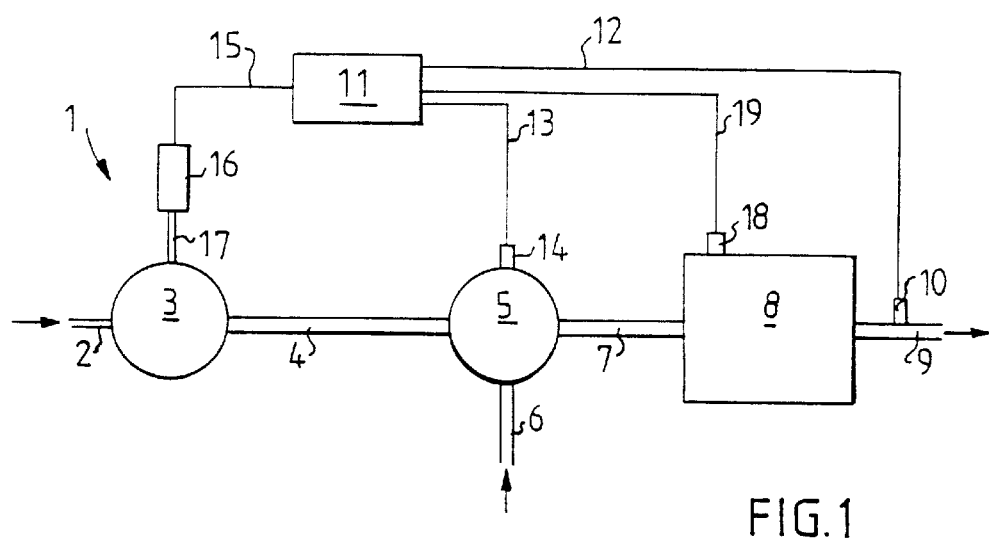
FIG. 1 shows schematically a device implemented according to the invention for fuel proportioning in a gas-powered combustion engine.

A device 1 implemented according to the invention for fuel proportioning includes a first gas line 2 via which gas at a certain pressure is led from a gas source (not depicted in detail) in the form of a gas tank into a gas regulator 3 for pressure reduction. From the gas regulator 3 the gas then proceeds at reduced pressure via another line 4 to a mixer 5 in which the incoming gas is mixed with air which is supplied via a third line 6. The resulting proportions of air and gas are such that the air/gas ratio $\lambda$ has a value exceeding 1.0, i.e. a lean mixture. From the mixer 5 the mixture of gas and air is led via a line 7 to a combustion engine 8 in which the mixture is burnt before leaving the engine 8 via an exhaust line 9 in order gradually to be led out, possibly via a catalyst, to the surrounding atmosphere. In the exhaust line 9 there is close to the engine an exhaust sensor 10 to detect the value of a parameter of the exhaust gases, here a $\lambda$ probe for detecting the $\lambda$ value or oxygen content of the exhaust gases. In this example the combustion engine takes the form of a piston type of engine intended for gas operation and is intended to be used as the drive engine in a vehicle, e.g. a heavy-duty bus.

A control unit 11 is connected via a line 12 to the exhaust sensor 10 and via a line 13 to an operating sensor 14 for detecting the operating conditions in which the engine 8 is operating. The operating sensor 14 is mounted on the mixer 5 and is arranged to detect the rotational position of the latter's throttle shaft (not depicted). The operating sensor 14 can thus detect whether the engine 8 is, for example, running at full load or not. In alterative embodiments other ways of detecting whether the engine is running at full load may be used. The control unit 11 controls via a line 15 an actuator 16 which via a control device 17 can act upon the pressure regulator 3 in order to reset the latter's outlet pressure.

In addition to the operating sensor 14 mounted on the mixer 5 to detect the engine's operating state, there is also a sensor 18 which is mounted directly on the engine 8 and is connected via a line 19 to the control unit 11. This sensor 18 is a speed sensor which detects the speed of the engine. Together with the sensor 14, it thus detects the engine's prevailing operating situation.

Figures 2, 3:
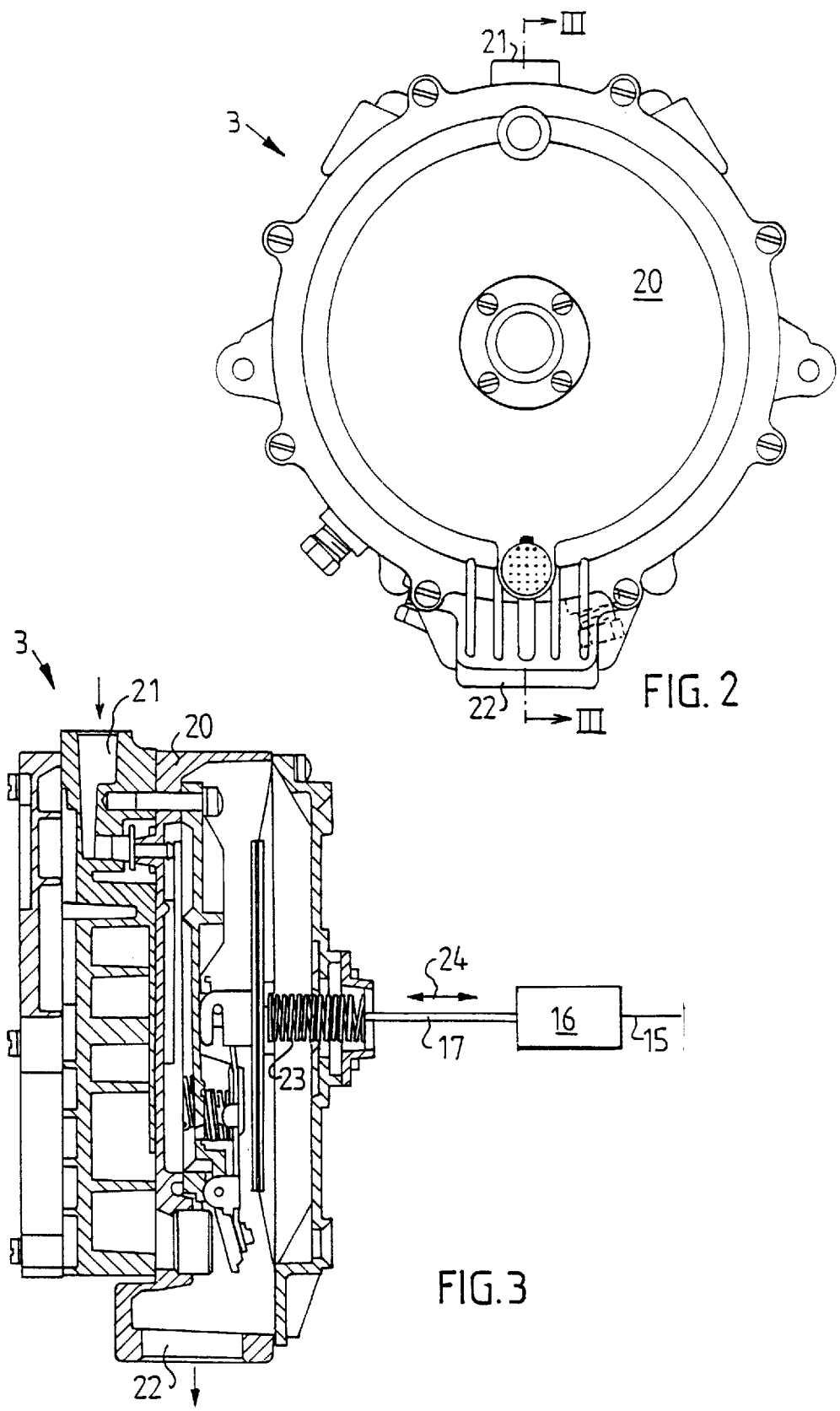
FIG. 2 shows an end view of a settable pressure controller for the device in FIG. 1.
FIG. 3 shows a section taken along with the line III—III in FIG. 2.

The mixer 5 takes the form of a mechanical type of mixer, e.g. of IMPCO® make type 200D, intended for use in engines. The pressure regulator 3 takes the form of a pressure regulator provided with setting facilities, e.g. of IMPCO® make, type T-PEV-1. Such a pressure regulator 3 is depicted in more detail in FIGS. 2 and 3. This pressure regulator has a housing 20 into which gas at a certain pressure is supplied via an inlet 21 and out of which the gas flows at a lower pressure via an outlet 22. An adjusting spring 23 for adjusting the ratio between the inlet and outlet pressures is arranged in the housing 20. The housing 20 is usually provided with an adjusting screw which can be acted upon manually to alter the tension of the adjusting spring 23. In the embodiment depicted here, however, the adjusting screw is replaced by the actuator 16 and the control device 17 whereby the actuator 16 can move the control device 17 in either direction represented by the double-headed arrow 24 to alter the tension in the adjusting spring 23 and hence alter the outlet pressure. The actuator 16 may advantageously be mounted on the pressure regulator 3 but may of course also be fastened elsewhere, e.g. directly to the engine, provided that its distance from the housing 20 is well defined.

Instead of the mixer and pressure regulator indicated above it is of course possible to use other similar types of mixer and pressure regulators.

In normal steady operating conditions the mixer 5 brings about desired proportions of air and gas so that the engine can be operated at a predetermined air/fuel ratio which is controlled and monitored by means of the exhaust sensor 10.

Changes in ambient temperature and in gas quality, which may for example arise from refuelling, may cause a change in the $\lambda$ value. Wear in the mixer 5 may also possibly alter the $\lambda$ value, thereby affecting the engine's emission level and torque. According to the invention, it is possible, while the engine continues to operate, for the outlet pressure from the gas regulator 3 to be automatically adjusted as necessary for monitoring and correcting a $\lambda$ value change. This is achieved automatically by the control unit 11 activating the actuator for a long enough time to make the control device 17 reset the pressure regulator to a pressure which results in the desired $\lambda$ value represented by a predetermined output voltage from the $\lambda$ probe 10. Gas pressure adjustment is advantageously carried out according to the invention when the engine is operating at full load, which is indicated by the sensor 14 on the throttle shaft and, within a certain engine speed range, indirectly by the sensor 18. Adjustment at full load will result in correct resetting in the worst operating situation, which is when correct adjustment is most critical. It is also possible to use a differently defined operating situation.

After adjustment has been effected and the desired set-value for $\lambda$ has again been reached, the engine is run conventionally with the pressure regulator setting constant and unchanged until a further adjustment becomes necessary, e.g. because of a change of gas quality arising from refuelling. Adjustment thus takes place relatively infrequently and normally required changes in fuel quantity are catered for by the driver by means of the mechanical mixer 5. The fact that adjustment takes place during operation ensures good combustion and a stable emission level.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Method for fuel proportioning in a gas-powered combustion engine, which comprises:

supplying gas to a pressure reduction device to reduce the pressure of the gas;

mixing the gas after pressure reduction with air to form a gas/air mixture;

supplying the gas/air mixture to the engine;

monitoring the value of a parameter in an exhaust gas of the engine, which parameter is related to the proportion of air and gas in the gas/air mixture;

monitoring the engine to determine when a predetermined operating situation of the engine is occurring; and when the monitored value of the parameter deviates from a predetermined set-value, if at essentially the same time the engine is monitored to be operating in a predetermined operating situation, adjusting the pressure level brought about by the pressure reduction to return the parameter to its set-value; and not adjusting the pressure level based on deviation of the value of the measured parameter from the set value when the engine is monitored to not be operating in the predetermined operating situation.

2. Method according to claim 1, wherein a lambda ($\lambda$) value of the exhaust gas is used as the monitored parameter.

3. Method according to claim 1, wherein the predetermined operating situation for adjustment is when the engine operates at full load.

4. Method according to claim 2, wherein the predetermined operating situation for adjustment is when the engine operates at full load.

5. Device for fuel proportioning in a gas-powered combustion engine for vehicles comprising:

- a pressure regulator for reducing pressure of gas supplied thereto:
- a mixer arranged after the pressure regulator for receiving the reduced pressure gas from the pressure regulator, mixing the reduced pressure gas with air to form a gas/air mixture and supplying the gas/air mixture to the engine;
- an exhaust sensor arranged in an exhaust of the engine to measure a parameter of an exhaust gas;
- a control unit connected to the exhaust sensor for resetting the proportion of the gas/air mixture as a function of the measured parameter; and
- at least one operating sensor connected to the control unit for sensing the operating situation of the engine;
- an actuator connected to the control unit, the actuator being coupled to the pressure regulator the control unit being operable to activate the actuator when the value of the measured parameter of an exhaust gas measured by the exhaust sensor deviates from a predetermined set-value, if at essentially the same time the operating sensor senses that a predetermined operating situation of the engine prevails, to adjust the pressure level of the reduced pressure gas to reset the value of the parameter to the predetermined set-value thereof; and
- the control unit deactivates the actuator when the set-value is reached.

6. Device according to claim 5, wherein the measured parameter is lambda ($\lambda$) and the exhaust sensor is a $\lambda$ probe for measuring $\lambda$ values greater than 1.0.

7. Device according to claim 5, wherein the operating sensor is a sensor for indicating a predetermined operating situation in the form of full load.

8. Device according to claim 5, wherein the operating sensor is a sensor which is coupled to a throttle shaft of the engine and is arranged to detect a full load position.

9. Device according to claim 5, wherein the operating sensor is a speed sensor arranged on the engine.

10. Device for fuel proportioning in a gas-powered combustion engine for vehicles, comprising:

- a pressure regulator for reducing pressure of gas supplied thereto;
- a mixer arranged after the pressure regulator for receiving the reduced pressure gas from the pressure regulator, mixing the reduced pressure gas with air to form a gas/air mixture and supplying the gas/air mixture to the engine;
- an exhaust sensor arranged in an exhaust of the engine to measure a parameter of an exhaust gas;
- a control unit connected to the exhaust sensor for resetting the proportion of the gas/air mixture as a function of the measured parameter; and
- at least one operating sensor connected to the control unit for sensing the operating situation of the engine;
- an actuator connected to the control unit, the actuator being coupled to the pressure regulator, the control unit being operable to activate the actuator when the value of the measured parameter of an exhaust gas measured by the exhaust sensor deviates from a predetermined set-value, if at essentially the same time the operating sensor senses that a predetermined operating situation of the engine prevails to adjust the pressure level of the reduced pressure gas to reset the value of the parameter to the predetermined set-value thereof; and
- the control unit does not activate the actuator when the operating sensor does not sense the engine is operating in the predetermined operating situation.

\* \* \* \* \*